United States Patent
Wang et al.

(10) Patent No.: US 10,929,986 B2
(45) Date of Patent: Feb. 23, 2021

(54) TECHNIQUES FOR USING A SIMPLE NEURAL NETWORK MODEL AND STANDARD CAMERA FOR IMAGE DETECTION IN AUTONOMOUS DRIVING

(71) Applicants: Zijian Wang, Troy, MI (US); Dalong Li, Troy, MI (US); Ivan Roman, White Lake, MI (US)

(72) Inventors: Zijian Wang, Troy, MI (US); Dalong Li, Troy, MI (US); Ivan Roman, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 149 days.

(21) Appl. No.: 16/224,946

(22) Filed: Dec. 19, 2018

(65) Prior Publication Data
US 2020/0202540 A1   Jun. 25, 2020

(51) Int. Cl.
| | |
|---|---|
| G06K 9/00 | (2006.01) |
| G06T 7/246 | (2017.01) |
| G06T 7/73 | (2017.01) |
| G06T 7/277 | (2017.01) |
| B60W 30/09 | (2012.01) |

(Continued)

(52) U.S. Cl.
CPC ............ *G06T 7/248* (2017.01); *B60W 30/09* (2013.01); *G06K 9/00805* (2013.01); *G06T 7/277* (2017.01); *G06T 7/74* (2017.01); *B60W 2420/42* (2013.01); *G05D 1/0088* (2013.01); *G05D 1/0214* (2013.01); *G05D 1/0246* (2013.01); *G05D 2201/0213* (2013.01); *G06T 2207/20084* (2013.01); *G06T 2207/30241* (2013.01); *G06T 2207/30261* (2013.01)

(58) Field of Classification Search
CPC . G06T 7/277; G06T 2207/30261; G06T 7/74; B60W 2420/42; B60W 30/09
See application file for complete search history.

(56) References Cited

U.S. PATENT DOCUMENTS

| 7,764,808 B2 | 7/2010 | Zhu et al. |
|---|---|---|
| 8,073,196 B2 | 12/2011 | Yuan et al. |
| 2016/0180195 A1 | 6/2016 | Martinson et al. |

(Continued)

OTHER PUBLICATIONS

Bradski, Gary, et al., "Learning Open CV 3—Computer Vision in C++ with the Open CV Library", O'Reilly Media, 1024 pages (2016).

(Continued)

*Primary Examiner* — Sam Bhattacharya
(74) *Attorney, Agent, or Firm* — Ralph E Smith

(57) ABSTRACT

An advanced driver assistance system (ADAS) and corresponding method for a vehicle utilize a camera system configured to capture an image and a controller configured to receive the captured image, detect an object in the captured image using a simple neural network model, track the detected object using a tracking technique to obtain a tracked position, project a trajectory of the detected object using a trajectory projection technique to obtain a predicted position, determine a most likely position of the detected object based on at least one of the tracked and predicted positions, generate a two-dimensional (2D) birdview projection illustrating the detected object according to its determined most likely position, and control at least one ADAS feature of the vehicle using the generated 2D birdview projection.

16 Claims, 3 Drawing Sheets

(51) Int. Cl.
*G05D 1/02* (2020.01)
*G05D 1/00* (2006.01)

(56) References Cited

U.S. PATENT DOCUMENTS

2018/0357495 A1\* 12/2018 Watanabe ............... G06T 7/593
2019/0163993 A1\* 5/2019 Koo ......................... G06K 9/52
2019/0353775 A1\* 11/2019 Kirsch .................... G01S 13/68
2020/0219268 A1\* 7/2020 Liu ...................... G06K 9/4628

OTHER PUBLICATIONS

Szegedy, Christian et al., "Rethinking the Inception Architecture for Computer Vision", CVPR Paper (Computer Vision Foundation, p. 2818-2826.
Wojke, Nicolai et al., "Simple online and realtime tracking with a deep association metric". 2017 IEEE international Conference Publication, p. 1-2 (Sep. 2017).

\* cited by examiner

TECHNIQUES FOR USING A SIMPLE NEURAL NETWORK MODEL AND STANDARD CAMERA FOR IMAGE DETECTION IN AUTONOMOUS DRIVING

FIELD

The present application generally relates to vehicle advanced driver assistance systems (ADAS) and, more particularly, to techniques for using a simple neural network model and a standard vehicle camera for image detection in autonomous driving.

BACKGROUND

Some vehicle advanced driver assistance systems (ADAS) utilize camera systems to capture images surrounding the vehicle. These images are then analyzed to detect and track nearby objects as part of various ADAS features. Objects are often blurred, shielded, occluded, or otherwise hidden and are therefore difficult to detect. As a result, conventional ADAS often detect and track objects from captured images using extensively trained, very deep neural networks (DNNs) and/or very high resolution cameras, possibly with high performance lenses. Implementing complex DNNs requires substantial processing power in order to operate in real-time, which typically results in the implementation of a more costly and more power consumptive central processing unit (CPU) or graphical processing unit (GPU), which can reduce overall vehicle efficiency. High performance cameras/lenses also increase costs. Accordingly, while such ADAS systems do work well for their intended purpose, there remains a need for improvement in the relevant art.

SUMMARY

According to one example aspect of the invention, an advanced driver assistance system (ADAS) for a vehicle is presented. In one exemplary implementation, the ADAS comprises: a camera system configured to capture an image a controller configured to: receive the captured image, detect an object in the captured image using a simple neural network model, track the detected object using a tracking technique to obtain a tracked position, project a trajectory of the detected object using a trajectory projection technique to obtain a predicted position, determine a most likely position of the detected object based on at least one of the tracked and predicted positions, generate a two-dimensional (2D) birdview projection illustrating the detected object according to its determined most likely position, and control at least one ADAS feature of the vehicle using the generated 2D birdview projection.

In some implementations, the simple neural network model is based on a TensorFlow single shot multi-box detector (SSD) algorithm. In some implementations, the detected object is labeled and the simple neural network model is trained using vehicle-to-vehicle transfer learning.

In some implementations, the tracking technique is based on the Hungarian method and includes applying a deep-sort single hypothesis tracking methodology with recursive Kalman filtering and frame-by-frame data association. In some implementations, the recursive Kalman filtering comprises a standard Kalman filter with constant velocity motion and a linear observation model.

In some implementations, the trajectory projection technique comprises using the squared Mahalanobis distance between predicted Kalman states and newly-arrived measurements to build a matching cascade. In some implementations, the building of the matching cascade as part of the trajectory projection technique overcomes at least one of object occlusion, hiding, and reformation.

In some implementations, the controller determines the most likely position of the detected object using a Softmax hub module that calculates a maximum likelihood position based on these tracked and predicted positions. In some implementations, the at least one ADAS feature comprises collision avoidance during an autonomous driving mode of the vehicle.

In some implementations, the controller is configured to generate the 2D birdview projection by determining matrix and distortion parameters of the camera system using a calibration routine, finding a chessboard on a ground plane view for the vehicle and obtaining at least four points at sub-pixel accuracy, using the at least four points to compute a homography matrix for the ground plane view, and using a perspective function to obtain the 2D birdview projection of the ground plane view.

According to another example aspect of the invention, a method of controlling at least one ADAS feature of a vehicle is presented. In one exemplary implementation, the method comprises: receiving, by a controller and from a camera system of the vehicle, a captured image, detecting, by the controller, an object in the captured image using a simple neural network model, tracking, by the controller, the detected object using a tracking technique to obtain a tracked position, projecting, by the controller, a trajectory of the detected object using a trajectory projection technique to obtain a predicted position, determining, by the controller, a most likely position of the detected object based on at least one of the tracked and predicted positions, generating, by the controller, a 2D birdview projection illustrating the detected object according to its determined most likely position, and controlling, by the controller, the at least one ADAS feature of the vehicle using the generated 2D birdview projection.

In some implementations, the simple neural network model is based on a TensorFlow SSD algorithm. In some implementations, the method further comprises labeling the detected object and training the simple neural network model using vehicle-to-vehicle transfer learning.

In some implementations, the tracking technique is based on the Hungarian method and includes applying a deep-sort single hypothesis tracking methodology with recursive Kalman filtering and frame-by-frame data association. In some implementations, the recursive Kalman filtering comprises a standard Kalman filter with constant velocity motion and a linear observation model In some implementations, the trajectory projection technique comprises using the squared Mahalanobis distance between predicted Kalman states and newly-arrived measurements to build a matching cascade. In some implementations, the building of the matching cascade as part of the trajectory projection technique overcomes at least one of object occlusion, hiding, and reformation.

In some implementations, the most likely position of the detected object is determined using a Softmax hub module that calculates a maximum likelihood position based on these tracked and predicted positions. In some implementations, the at least one ADAS feature comprises collision avoidance during an autonomous driving mode of the vehicle.

In some implementations, the 2D birdview projection is generated by determining matrix and distortion parameters of the camera system using a calibration routine, finding a chessboard on a ground plane view for the vehicle and obtaining at least four points at sub-pixel accuracy, using the at least four points to compute a homography matrix for the ground plane view, and using a perspective function to obtain the 2D birdview projection of the ground plane view.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there exists a need for improvement in automated driver assistance (ADAS) systems that detect and track objects from images captures by a camera system. It will be appreciated that the term "ADAS" as used herein includes driver assistance systems (lane keeping, adaptive cruise control, etc.) as well as partially and fully autonomous driving systems. A conventional ADAS for object detection and tracking utilizes a very deep neural network (DNN) extensively trained by machine learning with annotated (e.g., human labeled) training data. This requires a substantial amount of resources, both from a processing standpoint and a labeled training data standpoint, which increases costs and complexity. A very high resolution camera and/or a very high performance lens is also required, which further increases costs. Accordingly, simplified techniques for object detection and tracking are presented. These techniques perform bounding box detecting and tracking of an object in an image captured by a standard camera/lens system. Trajectory projection is also performed in the event that tracking fails. A two-dimensional (2D) projection is then generated, which illustrates the position of the tracked object. The term "birdview" as used herein refers to a bird's-eye elevated view of the area surrounding a vehicle (e.g., with a perspective as though the observer was a bird). The position information (and possibly other information, such as velocity/and acceleration) is then utilized by various ADAS features (e.g., collision avoidance during level 4, or L4 autonomous driving).

Figure 1:
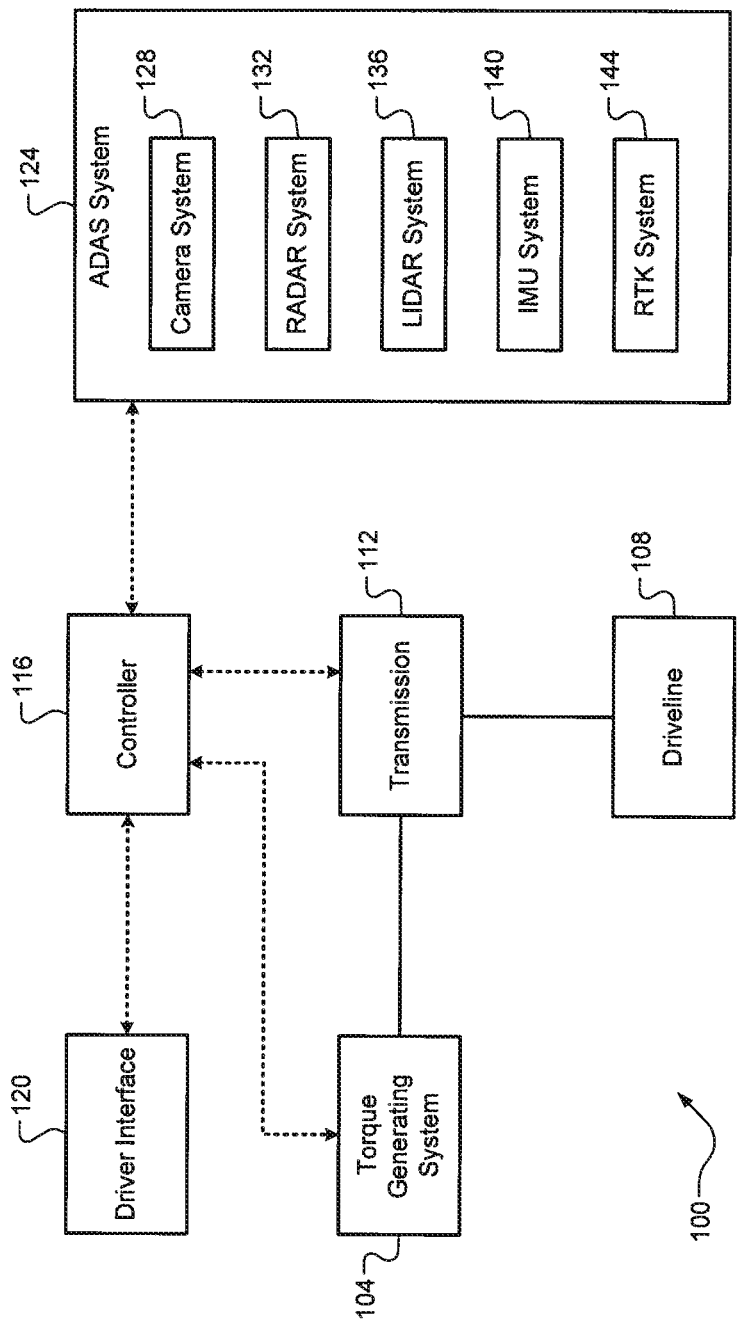
FIG. 1 is a functional block diagram of an example vehicle having an advanced driver assistance system (ADAS) with a standard camera/lens system according to some implementations of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via a transmission 112. A controller 116 controls operation of the torque generating system 104, such as to generate a desired drive torque based on a driver input via a driver interface 120 (a touch display, an accelerator pedal, combinations thereof, etc.). The vehicle 100 further comprises an ADAS 124 having a standard camera system 128. This camera system 128 is a conventional, low resolution, industry-standard camera/lens system that is typically included on production vehicles. While the ADAS 124 is illustrated as being separate from the controller 116, it will be appreciated that the ADAS 124 could be incorporated as part of the controller 116, or the ADAS 124 could have its own separate controller. The ADAS 124 or controller 116 of the present disclosure does not require a very high powered central processing unit (CPU) or graphical processing unit (GPU) that would be required by a very deep DNN operating with a very high resolution camera and/or very high performance lens. The ADAS 124 optionally includes other systems, such as, but not limited to, a radio detection and ranging (RADAR) system 132, a light detection and ranging (LIDAR) system 136, an inertial motion unit (IMU) system 140, and a real-time kinematic (RTK) system 144.

Figure 2:
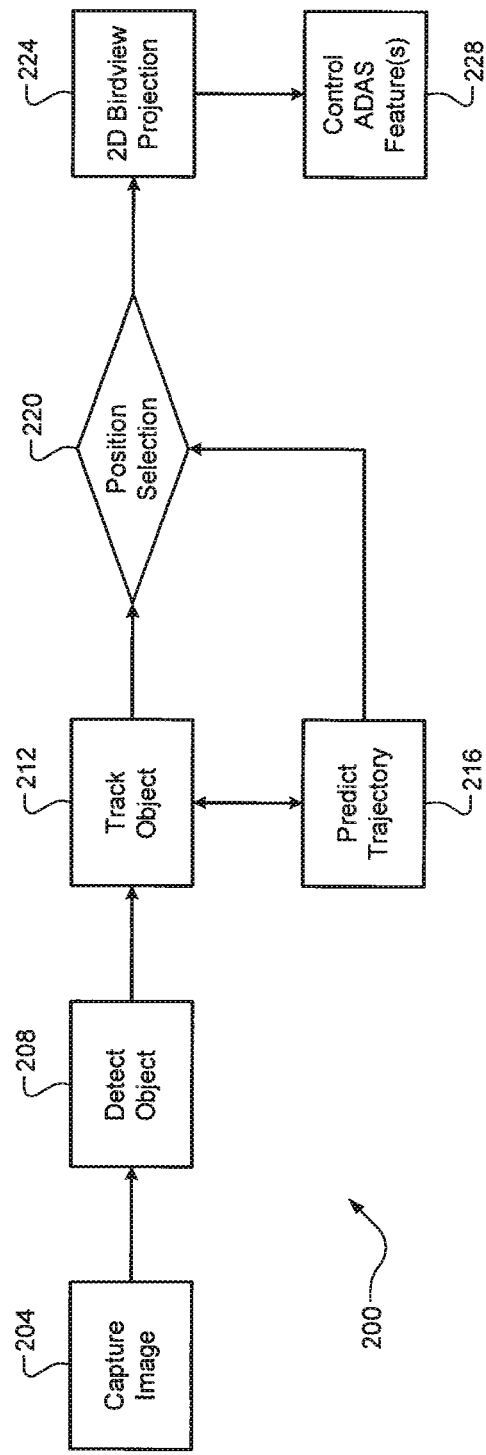
FIG. 2 is a functional block diagram of an example object detection and tracking architecture according to some implementations of the present disclosure.

Referring now to FIG. 2, a functional block diagram of an example object detection and tracking architecture 200 is illustrated. At 204, an image (or a frame from a video stream) is captured by the camera system 128. While a single image is often described herein, it will be appreciated that images (or a video stream) could be continually received and analyzed by this architecture 200. Also, while the detection and tracking of a single object are described below, it will be appreciated that multiple objects could be simultaneously detected in the image(s) and then tracked simultaneously. At 208, an object is detected in the captured image. This includes detecting a bounding box for the object using a simple neural network model. In one exemplary implementation, the simple neural network model is single shot multi-box detector (SSD) algorithm (e.g., with Inception V2) generated in TensorFlow. It will be appreciated that other suitable simple neural network models could be utilized. In some implementations, the detected object(s) are labeled and the simple neural network model is trained using transfer learning (e.g., sharing from vehicle to vehicle). At 212, the detected object (its bounding box) is tracked. In one exemplary implementation, this tracking technique is based on the Hungarian method including applying a deep-sort single hypothesis tracking methodology with recursive Kalman filtering and frame-by-frame data association. In one exemplary implementation, a standard Kalman filter with constant velocity motion and a linear observation model is used because it performs very well in road driving scenarios. It will be appreciated, however, that other suitable tracking methodologies and filters could be utilized.

At 216, object trajectory prediction also occurs while object tracking is occurring. In one exemplary implementation, the object trajectory prediction includes using the squared Mahalanobis distance between predicted Kalman states and newly-arrived measurements to build a matching cascade to overcome occlusion, hiding, and reformation. This is because object tracking could fail in these scenarios. It will be appreciated that other suitable trajectory prediction techniques could be utilized. At 220, a decision is made whether to select the tracked object position 212 or the projected object position from 216. In one exemplary implementation, a Softmax hub module is implemented to make the decision of whether object tracking has failed and the predicted object position based on trajectory prediction should be utilized. In other words, the Softmax hub module could calculate a maximum likelihood position based on these two positions. It will be appreciated that some combination of these positions could also be utilized (e.g., correction of the tracked position based on the predicted position). At 224, a 2D birdview projection is generated that illustrates the final position of the detected object. This 2D birdview projection, for example, is much simpler to process for ADAS features compared to a 3D representation such as a 3D LIDAR point cloud. In one exemplary implementation, camera system matrix and distortion parameters are known from a calibration routine and are used to generate a chessboard floor (e.g., with at least four points at sub-pixel accuracy) to obtain a ground plane image for the vehicle 100 (e.g., use found points to compute a homography matrix for the ground plain view), which is then remapped into the 2D birdview (e.g., using a perspective function). At 228, at least one ADAS feature, such as collision avoidance in an autonomous driving mode, utilizes the 2D birdview projection (the final object position) in its control routine. It will be appreciated that other parameters of the detected object could be determined and utilized by the ADAS feature(s), such as velocity and acceleration.

Figure 3:
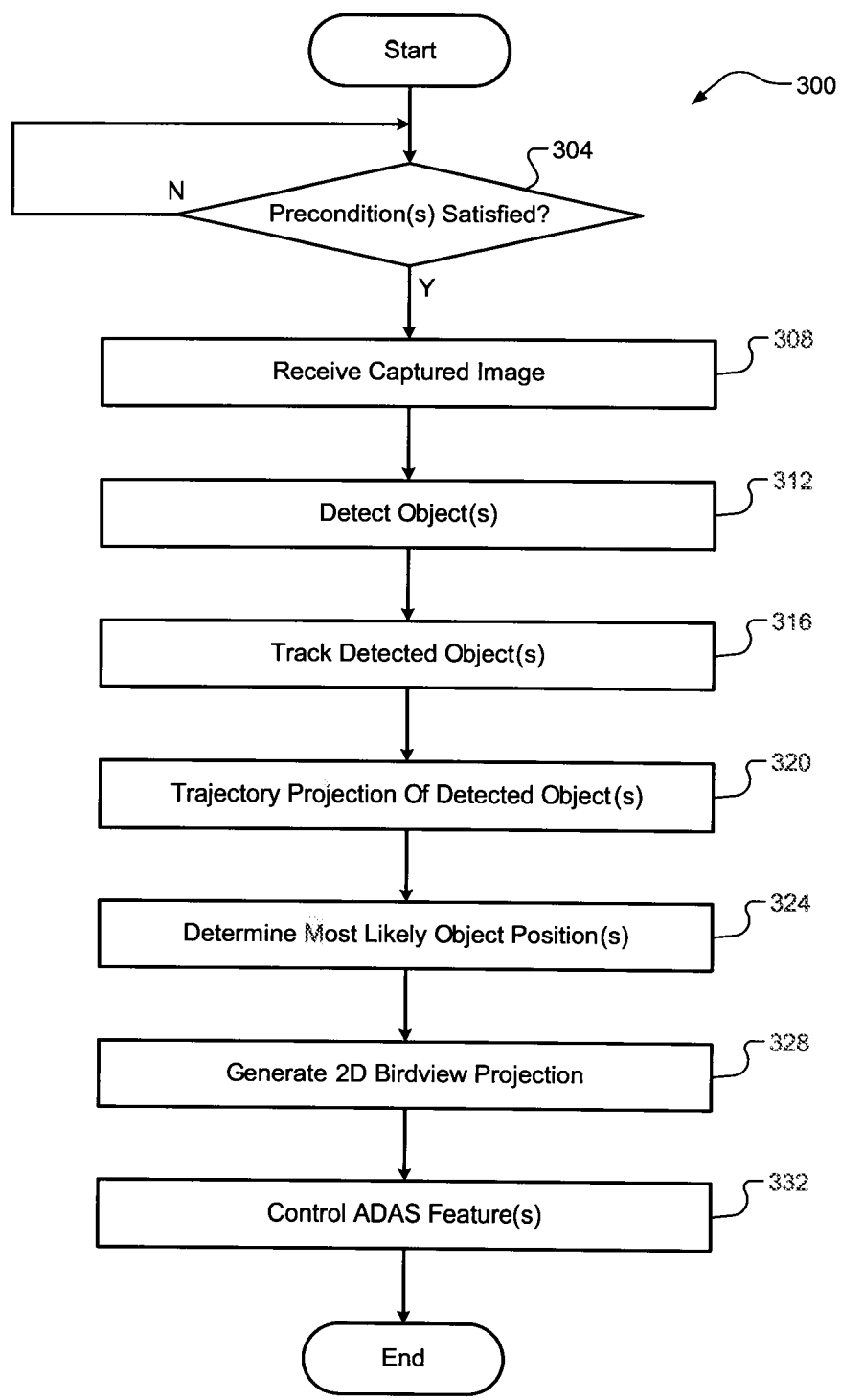
FIG. 3 is a flow diagram of an example method of object detection and tracking using a simple neural network model and a standard vehicle camera according to some implementations of the present disclosure.

Referring now to FIG. 3, a flow diagram of an object detection and tracking method 300 is illustrated. Specifics of the various techniques (detection, tracking, trajectory projection, etc.) described below are described above with respect to FIG. 2. At 304, the controller 116 optionally determines whether a set of one or more preconditions are satisfied. These could include, for example only, the vehicle 100 being operated (e.g., the torque generating system 104 being activated) and no malfunctions being present. At 308, the controller 116 receives the captured image or images (e.g., a video stream). At 312, the controller 116 detects one or more objects in the image(s) using the simple neural network model. At 316, the controller 116 tracks the detected object(s) using a tracking technique. At 320, the controller 116 performs trajectory projection of the detected object(s) using a trajectory projection technique. At 324, the controller 116 determines most likely object position(s) based on at least one of these tracked and projected or predicted object positions. At 328, the controller 116 generates a 2D birdview projection illustrating final position(s) of the detected object(s). At 332, the controller 116 controls one or more ADAS features (e.g., collision avoidance during an autonomous driving mode) using the generated 2D birdview projection. The method 300 then ends or returns to 304.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The controller could also include a memory as described above for storing template images. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An advanced driver assistance system (ADAS) for a vehicle, the ADAS comprising:
    a camera system configured to capture an image; and
    a controller configured to:
        receive the captured image;
        detect an object in the captured image using a simple neural network model, wherein the simple neural network model is based on a TensorFlow single shot multi-box detector (SSD) algorithm, and wherein the detected object is labeled and the simple neural network model is trained using vehicle-to-vehicle transfer learning;
        track the detected object using a tracking technique to obtain a tracked position;
        project a trajectory of the detected object using a trajectory projection technique to obtain a predicted position;
        determine a most likely position of the detected object based on at least one of the tracked and predicted positions;
        generate a two-dimensional (2D) birdview projection illustrating the detected object according to its determined most likely position; and
        control at least one ADAS feature of the vehicle using the generated 2D birdview projection.

2. The ADAS of claim 1, wherein the tracking technique is based on the Hungarian method and includes applying a deep-sort single hypothesis tracking methodology with recursive Kalman filtering and frame-by-frame data association.

3. The ADAS of claim 2, wherein the recursive Kalman filtering comprises a standard Kalman filter with constant velocity motion and a linear observation model.

4. The ADAS of claim 1, wherein the trajectory projection technique comprises using the squared Mahalanobis distance between predicted Kalman states and newly-arrived measurements to build a matching cascade.

5. The ADAS of claim 4, wherein the building of the matching cascade as part of the trajectory projection technique overcomes at least one of object occlusion, hiding, and reformation.

6. The ADAS of claim 1, wherein the controller determines the most likely position of the detected object using a Softmax hub module that calculates a maximum likelihood position based on these tracked and predicted positions.

7. The ADAS of claim 1, wherein the controller is configured to generate the 2D birdview projection by determining matrix and distortion parameters of the camera system using a calibration routine, finding a chessboard on a ground plane view for the vehicle and obtaining at least four points at sub-pixel accuracy, using the at least four points to compute a homography matrix for the ground plane view, and using a perspective function to obtain the 2D birdview projection of the ground plane view.

8. The ADAS of claim 1, wherein the at least one ADAS feature comprises collision avoidance during an autonomous driving mode of the vehicle.

9. A method of controlling at least one advanced driver assistance system (ADAS) feature of a vehicle, the method comprising:
    receiving, by a controller and from a camera system of the vehicle, a captured image;
    detecting, by the controller, an object in the captured image using a simple neural network model, wherein the simple neural network model is based on a TensorFlow single shot multi-box detector (SSD) algorithm, and wherein the detected object is labeled and the simple neural network model is trained using vehicle-to-vehicle transfer learning;

tracking, by the controller, the detected object using a tracking technique to obtain a tracked position;

projecting, by the controller, a trajectory of the detected object using a trajectory projection technique to obtain a predicted position;

determining, by the controller, a most likely position of the detected object based on at least one of the tracked and predicted positions;

generating, by the controller, a two-dimensional (2D) birdview projection illustrating the detected object according to its determined most likely position; and controlling, by the controller, the at least one ADAS feature of the vehicle using the generated 2D birdview projection.

10. The method of claim 9, wherein the tracking technique is based on the Hungarian method and includes applying a deep-sort single hypothesis tracking methodology with recursive Kalman filtering and frame-by-frame data association.

11. The method of claim 10, wherein the recursive Kalman filtering comprises a standard Kalman filter with constant velocity motion and a linear observation model.

12. The method of claim 9, wherein the trajectory projection technique comprises using the squared Mahalanobis distance between predicted Kalman states and newly-arrived measurements to build a matching cascade.

13. The method of claim 12, wherein the building of the matching cascade as part of the trajectory projection technique overcomes at least one of object occlusion, hiding, and reformation.

14. The method of claim 9, wherein the most likely position of the detected object is determined using a Softmax hub module that calculates a maximum likelihood position based on these tracked and predicted positions.

15. The method of claim 9, wherein the 2D birdview projection is generated by determining matrix and distortion parameters of the camera system using a calibration routine, finding a chessboard on a ground plane view for the vehicle and obtaining at least four points at sub-pixel accuracy, using the at least four points to compute a homography matrix for the ground plane view, and using a perspective function to obtain the 2D birdview projection of the ground plane view.

16. The method of claim 9, wherein the at least one ADAS feature comprises collision avoidance during an autonomous driving mode of the vehicle.

* * * * *